US010352386B2

(12) United States Patent
Langenbeck et al.

(10) Patent No.: US 10,352,386 B2
(45) Date of Patent: Jul. 16, 2019

(54) CLUTCH ASSEMBLY

(71) Applicant: Ortlinghaus-Werke GmbH, Wermelskirchen (DE)

(72) Inventors: Bernhard Langenbeck, Dortmund (DE); Markus Albrecht, Düsseldorf (DE); Kai Priedigkeit, Hückeswagen (DE)

(73) Assignee: ORTLINGHAUS-WERKE GMBH, Wermelskirchen (DE)

(*) Notice: Subject to any disclaimer, the term of this patent is extended or adjusted under 35 U.S.C. 154(b) by 255 days.

(21) Appl. No.: 15/172,521

(22) Filed: Jun. 3, 2016

(65) Prior Publication Data
US 2017/0307037 A1  Oct. 26, 2017

(30) Foreign Application Priority Data

Apr. 20, 2016 (EP) .................... 16166127

(51) Int. Cl.
*F16D 67/02* (2006.01)
*F16D 67/04* (2006.01)
*B63H 23/30* (2006.01)
*F16D 13/52* (2006.01)
*F16D 13/72* (2006.01)
*F16D 13/74* (2006.01)
*F16D 25/12* (2006.01)

(52) U.S. Cl.
CPC ............ *F16D 67/04* (2013.01); *B63H 23/30* (2013.01); *F16D 13/52* (2013.01); *F16D 13/72* (2013.01); *F16D 13/74* (2013.01); *F16D 25/123* (2013.01)

(58) Field of Classification Search
CPC ...................................................... F16D 67/02
See application file for complete search history.

(56) References Cited

U.S. PATENT DOCUMENTS

| | | | | |
|---|---|---|---|---|
| 2,658,412 A * | 11/1953 | Kelbel | .................... | F16H 47/06 475/52 |
| 2,786,560 A * | 3/1957 | Ishoy | .................... | A01B 71/06 188/72.2 |
| 4,074,581 A * | 2/1978 | Stevens | .................. | F16H 3/085 475/207 |
| 4,828,089 A * | 5/1989 | Collins | .................. | F16D 13/52 188/251 A |
| 5,190,129 A | 3/1993 | Sommer | | |
| 5,291,977 A * | 3/1994 | Sommer | ................ | F16D 67/06 192/147 |
| 8,393,236 B1 * | 3/2013 | Hauser | .................... | F16D 55/24 74/11 |
| 9,194,473 B1 * | 11/2015 | Hauser | .................. | B60K 17/28 |
| 2017/0241494 A1 * | 8/2017 | Jones | ...................... | F16D 55/24 |

FOREIGN PATENT DOCUMENTS

| | | |
|---|---|---|
| DE | 102015114926 A1 | 3/2016 |
| EP | 2090800 A1 | 8/2009 |
| EP | 2295825 A2 | 3/2011 |
| WO | 9601957 A1 | 1/1996 |

* cited by examiner

*Primary Examiner* — Tisha D Lewis
(74) *Attorney, Agent, or Firm* — Harness, Dickey & Pierce, P.L.C.

(57) ABSTRACT

An operating assembly for a mechanical connection of an engine to a work machine includes a drive shaft unit and an output shaft unit which are connected by a dynamically controllable multi-plate clutch. A holding brake acts on the output shaft unit. The operating assembly includes a control unit. The holding brake is a dynamically controllable brake.

10 Claims, 3 Drawing Sheets

CLUTCH ASSEMBLY

CROSS-REFERENCE TO RELATED APPLICATIONS

This application claims the benefit and priority of European patent application no. 161661277 filed Apr. 20, 2016. The entire disclosure of the above application is incorporated herein by reference.

FIELD

The present invention relates to an operating assembly for the mechanical connection of an engine to a work machine. Such operating assemblies are sufficiently known in the state of the art. An engine is usually connected to a drive shaft unit, a work machine is usually connected to an output shaft unit. It is known to interpose for example hydraulically operated multi-plate clutches between the drive shaft unit and the output shaft unit. Since it is known that, under certain circumstances, multi-plate clutches, depending on the respective device operating state, also transmit undesired drag torques—this is in particular the case of oil-lubricated multi-plate clutches—a holding brake is inserted, if needed, in the area of an output shaft unit or an output shaft, in order to definitively stop the work machine.

Such units are used for different applications, for example for maritime applications where they are arranged between a diesel generator set and the propeller system, but also in current generator units and the like.

BACKGROUND

Multi-plate clutches are also well known assemblies, in which plates that are directly or indirectly connected to a drive shaft rotate with respect to plates fixed on the housing. These plate packs can be moved in the axial direction against a spring force or any other preload, for example by means of hydraulic force, such that the distance between the rotating and the stationary plates is variable. In full contact a power transfer (rotational speed×torque) takes place and in case of a complete detachment, the drive and the output are separated from each other in an end position which offers a sufficient distance. Intermediate stages can be controlled in usual installations by means of a corresponding control of the pressure medium.

As soon as a drive starts and makes a drive shaft rotate, the drive shaft of the clutch unit will be set in rotation. The multi-plate clutch will be engaged by a corresponding pressurization by means of a pressure medium, for example pressure oil, and thus a corresponding transmission of the rotation will be enabled.

It is known that only by varying the pressure on the clutch piston, an essentially continuous speed adjustment of the output side with respect to the drive speed can take place without even influencing the drive speed. Auxiliary units for providing lubricating oil, cooling oil medium and the like are of course provided.

It is known that in the low speed ranges of combustion engines this speed adjustment has its limit. Speeds beneath the motor idle speeds are usually not possible. The use of an adjustable multi-plate clutch makes it however possible to operate this one with a low engagement pressure, wherein one calls this a "slipping clutch". In this operating state, there is no synchronous run between the drive and the output side. This is for example the case, if the engine has to be operated for other reasons within a correspondingly high speed range. Such reasons can be the provision of power for safety devices for fire-fighting and the like.

The slipping of the clutches leads to a power loss.

The cooling capacity is of a correspondingly high importance. The power loss arising in the slipping operation is dissipated from the clutch via the internally supplied quantity of oil. This energy input has to be dissipated from the system via a cooler. Usually this is realized by means of a water-oil heat exchanger. Apart from the quantity of supplied cooling medium and the entry temperature of the cooling medium, the quantity of oil which is made available on the side of the clutch is correspondingly decisive. High quantities of oil are required for dissipating high power losses. As it is however in the practical operation of the units impossible to predict when the maximum power loss will take place, a correspondingly high amount of cooling oil has to be pending. If the clutch is open, this high quantity of oil however causes the generation of high drag torques which can lead to correspondingly high speeds on the output side. These speeds are however usually not desired if the clutch is open. The aim would be the continuous speed adjustment until zero.

A possible remedy is a holding brake, by means of which the output side is definitely fixed. But an uncontrollable speed range will remain.

SUMMARY

Based upon the described state of the art, it is the object of the present invention to provide an operating assembly of the generic type, by means of which larger speed ranges, in particular lower speeds, can be clearly controlled.

For the technical solution of this problem, an operating assembly having the features of claim 1 is proposed. Other advantages and features will result from the sub-claims.

A proposal for a method according to the invention results from the features of claim 7. Other advantages and features will result from the sub-claims.

According to the invention it is provided to use a brake which can be dynamically controlled as holding brake. Thanks to this measure, the holding brake can be dynamically controlled and an appropriate braking torque can be set.

Both the clutches and the brakes can be actuated by different media. Generally one speaks of auxiliary energy. If within the scope of the present application it is exemplarily spoken of hydraulics, control of the hydraulic pressure, hydraulic clutch, hydraulic brake and the like, this is not limiting. All other possible auxiliary energies, by means of which corresponding clutches and brakes can be actuated, are also included.

In so far, it is possible to compensate drag torques in the multi-plate clutch by means of a simultaneous control of the hydraulic pressure on the multi-plate clutch, on the one hand, and the hydraulic pressure on the holding brake, on the other hand.

Thanks to the operating assembly according to the invention it is possible to adjust and control the output speed at nearly between 0 and 100% of the drive speed.

According to an advantageous proposal of the invention, the multi-plate clutch and the holding brake can be integrated in one housing. Thanks to this proposal, a highly compact unit can be realized, which can be inserted into a shaft line, which can inter alia comprise cardan shafts. A corresponding operating assembly can comprise auxiliary drives which can, according to another proposal of the invention, be used for a hydraulic supply to the required power flows, lubricant flows and/or cooling oil flows. Such auxiliary drives can be for example connected to the drive shaft unit.

According to the invention, the operating assembly comprises a control unit. This one is designed such that it comprises a unit for the stepless regulation of the hydraulic pressure on the multi-plate clutch, such that the multi-plate clutch can be adjusted between a full power transfer, on the one hand, and a complete separation, on the other hand. The control unit furthermore comprises a unit for adjusting the hydraulic pressure on the holding brake, such that this one can be set between free run and fixation.

The solution according to the invention provides an operating assembly which can be easily assembled and inserted. According to an advantageous proposal of the invention, this one is for example inserted between a diesel machine and a propeller for a marine propulsion drive. The use of the device according to the invention can compensate the drag torque of the clutch by varying the pressure on the brake piston, such that the output speed can be set to the value desired by the operator. If the drag torque is too low, the brake will be completely opened and the slipping clutch can increase the output speed, as usually, to the desired value. The speed regulation is realized by the speed alignment between the drive and the output speed and the pressure adaptation related thereto by means of for example proportional valves. The invention also makes it possible to apply a firm pressure to the brake and this in the range of slow output speeds, which pressure is so high that the maximum arising drag torque will be completely compensated. If the pressure generation fails, the holding brake can be manually engaged by means of a device.

Concerning the method, the invention proposes to set respectively regulate both the pressure on the multi-plate clutch and the pressure on the holding brake. For this purpose, a controllable hydraulic brake has to be used, as it is proposed by the invention. In this manner it is possible according to the invention to control a drag torque arising at the multi-plate clutch by means of the regulation of the hydraulic pressure applied to the holding brake. The regulation thus enables to set an output speed in a completely independent manner from the speed of the engine. Herein, it goes without saying that the engine provides a correspondingly higher speed.

According to the invention it is provided that the engine is operated with a minimum speed. In this manner, emergency functions can be maintained, for example the emergency operation of safety installations, or also operation states of for example a ship, inter alia holding position in the countercurrent, slow movement in the harbor area, operating fire pumps and compensating the blowback and the like.

According to the invention the clutch and the brake are thus both controlled. This requires the use according to the invention of a dynamically controllable brake. The device thus comprises a clutch and a brake which can be both dynamically controlled such that even with low speeds a controllable output speed can be set and maintained.

DRAWINGS

Other advantages and features of the invention will become apparent from the following description by means of the figures. Herein:

In the figures the same elements are provided with the same reference signs.

DESCRIPTION

Figure 1:
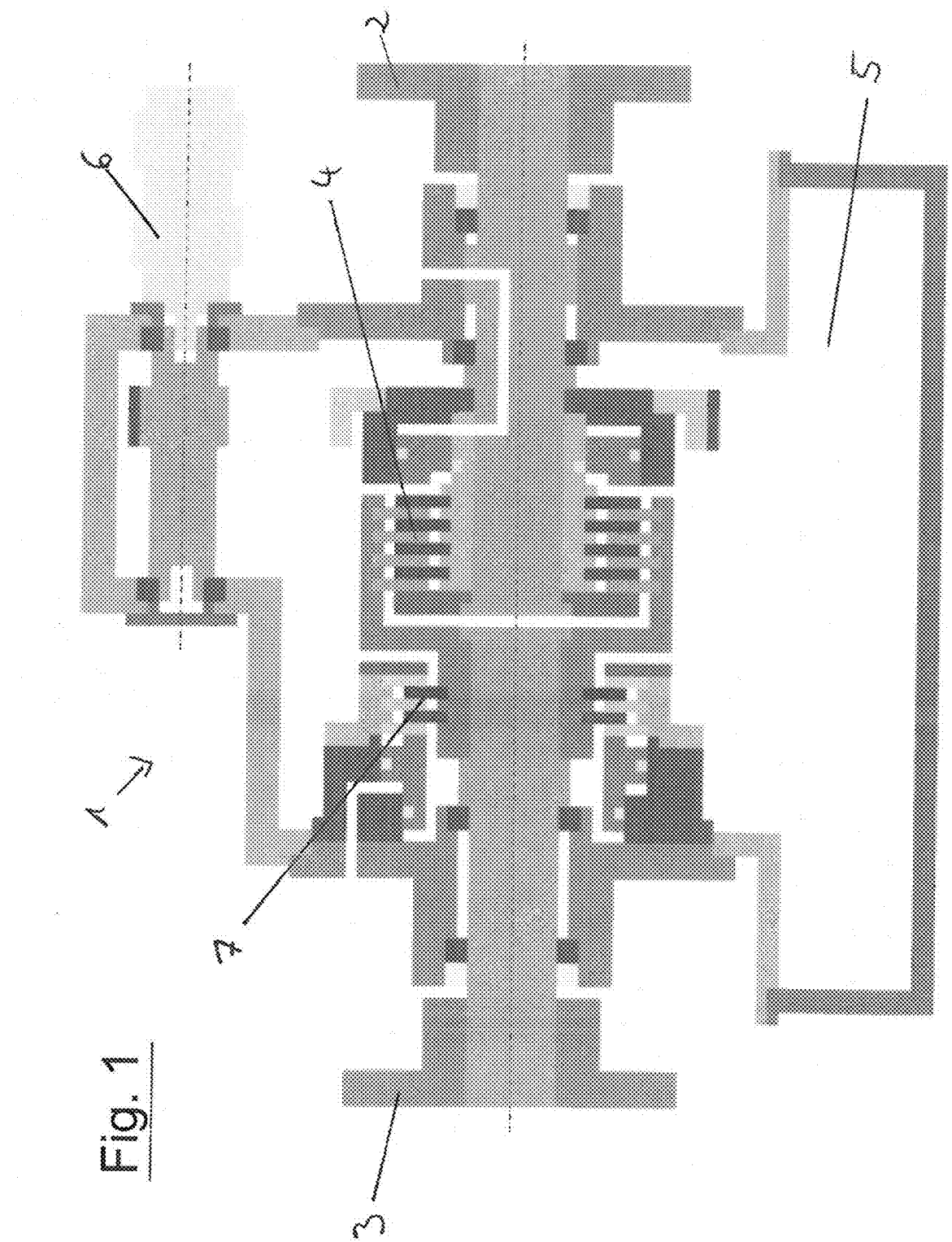
FIG. 1 is a cut schematic diagram of an operating assembly according to the invention.

As shown in FIG. 1, the exemplary embodiment consists of an integrated assembly, in which a drive shaft unit 2 is guided over a multi-plate clutch 4 and a holding brake 7 to an output shaft unit 3. Hydraulic oil is provided from an oil sump 5, the oil being delivered via a connected pump 6.

The holding brake 7 as well as the multi-plate clutch 4 is a dynamically controllable assembly.

Figure 2:
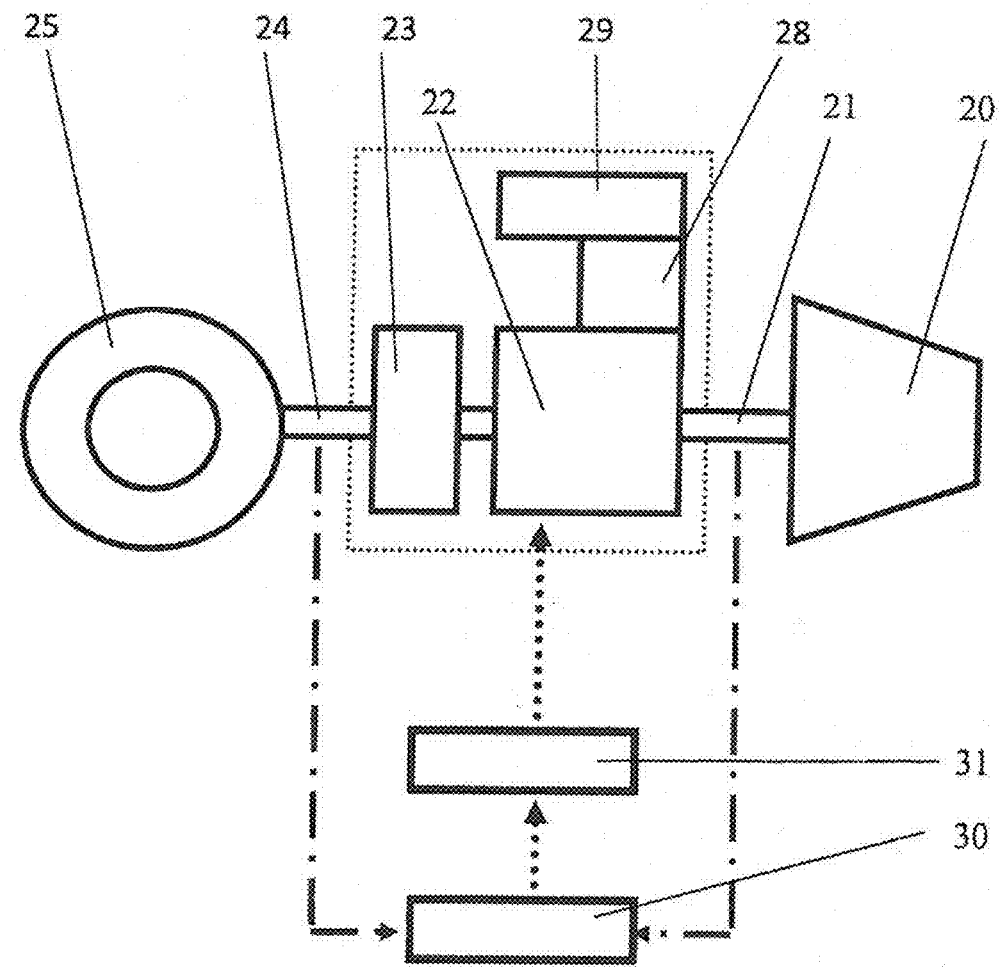
FIG. 2 is a schematic view of the functional groups and the regulation processes and FIG. 3 is a perspective view of a use of an operating assembly according to the invention in a marine propulsion drive.

According to FIG. 2, the speed of a drive shaft 21, which is driven by an engine 20, and the speed of an output shaft 24, which is transmitted to a work machine 25, will be compared. Depending on the target setting, the control unit (not shown) ensures that a corresponding torque is set, which is indicated with 31. Thus, a corresponding pressure is applied to the multi-plate clutch 22, on the one hand, and independently therefrom, to the holding brake 23, if a need for this exists.

Figure 3:
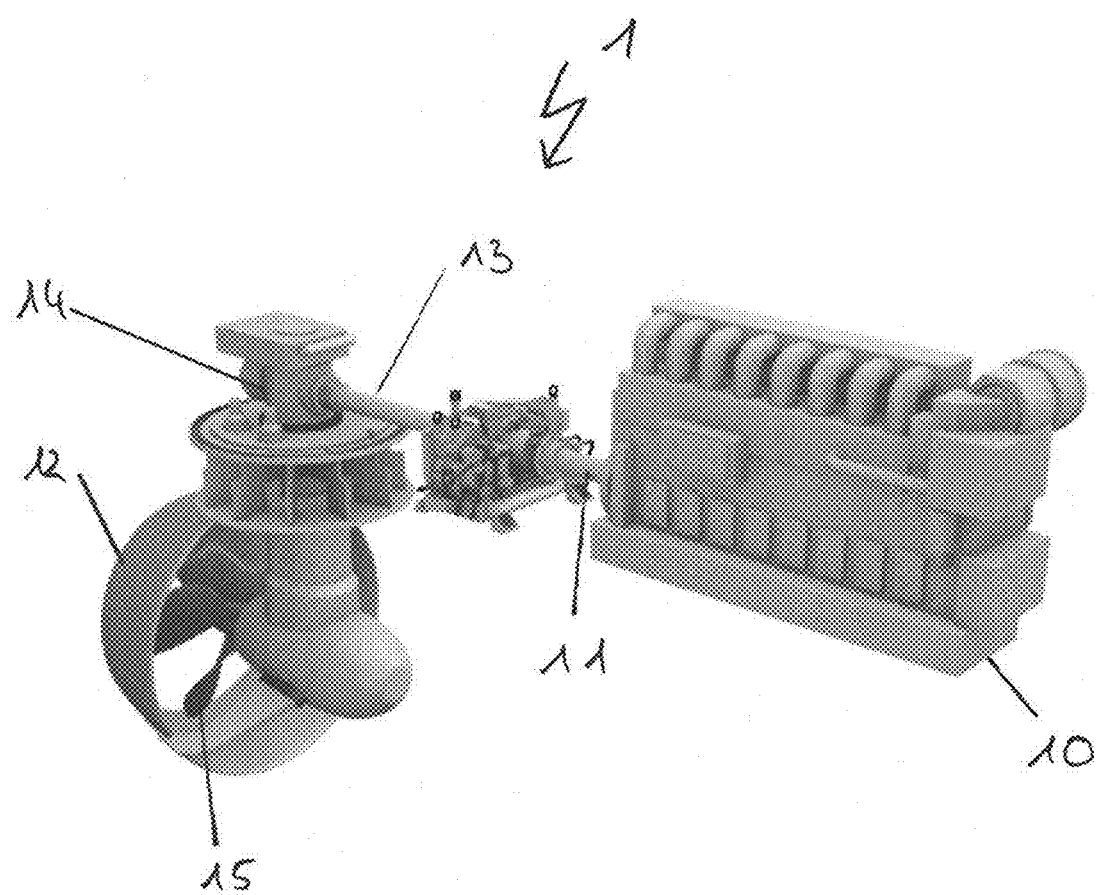

FIG. 3 exemplarily shows an application case, wherein a marine diesel 10 transmits its power to the drive shaft 11. The operating unit 1 transmits power to the output shaft 13 in a needs-based manner. A propeller 15 of a propeller group 12 is correspondingly driven via a gear 14.

The described exemplary embodiment only serves for explanation and is not limiting. It goes without saying that corresponding sensors are provided in order to determine temperatures, pressures, speeds, oil levels and the like in a needs-based manner and to make them available to the control unit.

What is claimed is:

1. An operating assembly for the mechanical connection of an engine to a work machine, comprising:
   a drive shaft unit and an output shaft unit which are connected by a dynamically controllable multi-plate clutch, wherein the multi-plate clutch is adapted to provide an operating state in which there is no synchronous run between the drive shaft unit and the output shaft unit, wherein the drive shaft unit rotates at a drive speed greater than an output speed of the output shaft unit when in the operating state; and
   a holding brake acting upon the output shaft unit as well as a control unit, wherein the holding brake is a dynamically controllable brake.

2. The operating assembly according to claim 1, wherein the multi-plate clutch and the holding brake are integrated in a common housing.

3. The operating assembly according to claim 1, further comprising auxiliary drives.

4. The operating assembly according to claim 3, further including pumps for a hydraulic supply of power, lubricant and/or cooling oil flows, wherein the pumps are driven by the auxiliary drives.

5. The operating assembly according to claim 1, further comprising an electrically operated pump.

6. The operating assembly according to claim 1, wherein the control unit comprises a unit for the stepless regulation of the hydraulic pressure on the multi-plate clutch between separation and full power transmission as well as a unit for the stepless adjustment of the hydraulic pressure on the holding brake between free run and fixation.

7. A method for operating an operating assembly according to claim 1, comprising:
   regulating the output speed of the drive shaft unit by controlling both the multi-plate clutch and the holding brake.

8. The method according to claim 7, wherein drag torques arising at the multi-plate clutch are compensated by controlling the holding brake.

9. The method according to claim 7, wherein regulating the output speed is carried out independently from the speed of the engine.

10. The method according to claim 7, wherein regulating the output speed is carried out while maintaining a minimum speed of the engine.

\* \* \* \* \*